(12) United States Patent
Chung et al.

(10) Patent No.: US 11,086,823 B2
(45) Date of Patent: Aug. 10, 2021

(54) FILE DEDUPLICATION USING SIGNATURE INFORMATION

(71) Applicant: Dropbox, Inc., San Francisco, CA (US)

(72) Inventors: Dong-Jae Chung, Redwood City, CA (US); Anna Geiduschek, San Francisco, CA (US); Aakash Kambuj, Seattle, WA (US); Raveesh Nayar, San Francisco, CA (US); Sam Stafford, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 239 days.

(21) Appl. No.: 15/857,009

(22) Filed: Dec. 28, 2017

(65) Prior Publication Data

US 2019/0205413 A1 Jul. 4, 2019

(51) Int. Cl.
*G06F 16/174* (2019.01)
*G06F 16/14* (2019.01)

(52) U.S. Cl.
CPC ........ *G06F 16/1748* (2019.01); *G06F 16/152* (2019.01)

(58) Field of Classification Search
CPC .......................... G06F 16/1748; G06F 16/152
See application file for complete search history.

(56) References Cited

U.S. PATENT DOCUMENTS

| 6,918,036 | B1 * | 7/2005 | Drews | G06F 21/64 |
| | | | | 713/156 |
| 7,870,089 | B1 * | 1/2011 | Hall, III | H04L 51/08 |
| | | | | 705/50 |
| 8,281,066 | B1 * | 10/2012 | Trimmer | G06F 3/0641 |
| | | | | 711/103 |
| 8,285,681 | B2 * | 10/2012 | Prahlad | G06F 3/0649 |
| | | | | 707/640 |
| 8,626,723 | B2 * | 1/2014 | Ben-Shaul | G06F 3/0608 |
| | | | | 707/692 |
| 8,639,663 | B2 | 1/2014 | Anglin et al. | |
| 8,712,974 | B2 | 4/2014 | Datuashvili et al. | |
| 8,954,399 | B1 | 2/2015 | Narayanan et al. | |
| 9,031,329 | B1 * | 5/2015 | Farid | G06K 9/00577 |
| | | | | 382/209 |

(Continued)

OTHER PUBLICATIONS

CNETRef: Stephen Shankland, "Apple's tricky iOS 11 photo tech gets a helping hand", Oct. 6, 2017, accessible from <https://www.cnet.com/news/tools-bridge-between-apple-heic-and-jpeg-photos/>. (Year: 2017).*

(Continued)

*Primary Examiner* — Matthew Ell
*Assistant Examiner* — Anugeetha Kunjithapatham
(74) *Attorney, Agent, or Firm* — Polsinelli PC

(57) ABSTRACT

Aspects of the subject technology relate to ways to avoid file duplication in a cloud storage service. In some aspects, a method of the technology includes steps for retrieving, via a computer network, one or more files from a first memory location, identifying a first signature and a second signature for each of the files, and storing the first signature and the second signature into a duplication reference list. In some aspects, the method further includes steps for analyzing files in a second memory location to identify duplicate files using the duplication reference list. Systems and computer-readable media are also provided.

14 Claims, 8 Drawing Sheets

(56) References Cited

U.S. PATENT DOCUMENTS

| | | | |
|---|---|---|---|
| 9,357,009 B2 | 5/2016 | Resch et al. | |
| 9,367,397 B1 | 6/2016 | Ying et al. | |
| 9,824,018 B2 | 11/2017 | Vikram et al. | |
| 2008/0235200 A1* | 9/2008 | Washington | G06F 21/10 |
| 2017/0193003 A1 | 7/2017 | Vijayan et al. | |

OTHER PUBLICATIONS

WWDC-HEIF: Thomson et. al, "Introducing HEIF and HEVC", 2017, accessible from <https://developer.apple.com/videos/play/wwdc2017/503/> (Year: 2017).*

* cited by examiner

FILE DEDUPLICATION USING SIGNATURE INFORMATION

TECHNICAL FIELD

Aspects of the disclosed technology relate to systems and methods for avoiding file duplication using unique file identifiers (signatures). In some aspects, multiple signatures are used to identify file duplicates, for example, including hash-based signatures and/or platform specific identifiers that are embedded in file data or exposed via a platform process.

BACKGROUND

The need for network-based data storage continues to increase with the data storage capabilities of network-connected devices, such as smartphones tablets, laptops, and the like. Some cloud-based storage services perform routine (e.g., periodic or continuous) backups of new or altered data to ensure that recently changed files are backed up. As the number of connected devices begins to scale, one challenge of performing network data backups is to select only new (or newly altered) data for backup, while avoiding the recurring transfer of redundant files.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
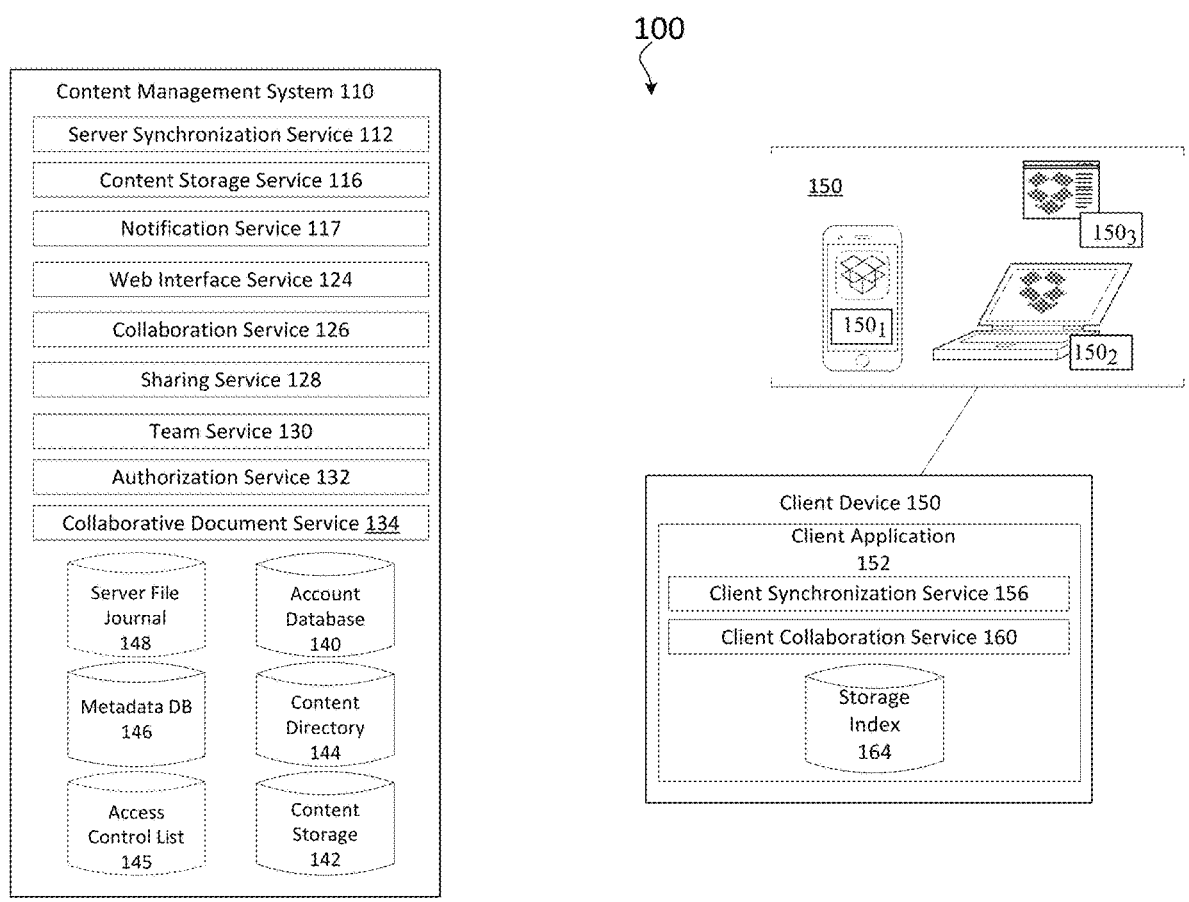
FIG. 1 shows an example of a content management system and client devices.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The disclosed technology addresses a need in the art for avoiding data duplication, and in particular, for avoiding transfers of redundant content items into cloud storage by providing novel means for accurate identification of file duplicates. File identification can be performed using a duplication reference list that stores signature information for each file that has already been committed to cloud storage. As discussed in further detail below, the reference list can include multiple signature types, such as, a platform specific identifier and/or a hash signature for each uploaded file, depending on what signatures are available for the uploaded file.

In some cloud backup solutions, multiple network-connected devices may be linked to the same account that is associated with a user or owner of the devices. In such arrangements, files altered on one device can be automatically backed up onto cloud storage and subsequently the updates can be filtered down to the remaining devices. Where multiple network devices are associated with a particular backup storage account, it is not uncommon that such devices may utilize different operating systems (OS) and consequently, different file systems that can only support certain file extension types. As a result, operating systems may transcode a file to a different file format and/or file extension for compatibility.

One challenge in performing backups and file synchronization across devices using different OS platforms is that files transcoded upon transfer between operating systems can result in byte-wise differences in file data for (otherwise) identical files, leading to the duplication of backups for that file. Especially in cases when the de-duplication mechanism relies on hash-based signatures. In some instances, some OS platforms have proprietary file formats, which results in files having different file extensions, that are redundant since they include the same content, and that are byte-wise different files, leading to the potential for erroneous backup duplication. In some instances, the transcoding of files into different formats (e.g., when moving files between OS types and transcoding files using platform APIs on-device) can result in redundant, but byte-wise different, files of similar extension types, also leading to the potential for erroneous backup duplication.

By way of example, image files generated on a first device utilizing Apple's iOS 11 operating system can be formatted using the High Efficiency Image Format (HEIF) standard having a ".heic" file extension, as opposed the more common Joint Photographic Expert Group (JPEG) standard that uses a ".jpeg" or ".jpg" file extension. The .heic images on the first (iOS) device can be transferred to cloud storage, either in .heic format, or transcoded to a more common format, such as .jpeg, during the transfer process. Additionally, the same .heic files may be transferred to a second device, such as a personal computer (PC) or tablet device, associated with the cloud backup account. For device-to-device transfers, transcoding into a legacy format (e.g., .jpeg or .jpg) can also be performed by the operating system (especially when the second device does not support HEIF format), however, such transcoding is often implemented using different processes (e.g., codecs) than are used for transcoding performed for cloud storage transfers. As a result, the same photo can end up as three byte-wise unique files (the original in .heic format, a first transcoded file (transcoded by cloud storage service), and a second transcoded file (transcoded by the OS on the first device). Each of these files can look unique to the cloud storage service since they are all byte-wise different files.

In a first example, a .heic version of an image file is stored to the cloud after being transferred to the cloud from the first device, and a .jpeg format version (resulting from a transcoding of the .heic version) is stored on the second device. In such instances, the .jpeg version on the second device, although redundant (i.e., the file contains the same image) to the uploaded (.heic) version in the cloud, may appear (e.g., to cloud management software), to be a different file and therefore, erroneously marked for cloud backup.

In a second example, a .heic version of the image file is transcoded, by cloud management software using a first codec, and stored to the cloud in .jpeg format. The corresponding .jpeg version on the second device, having been transcoded using a different (second) codec, is byte-wise different from the .jpeg version stored in the cloud. In such instances, the .jpeg version on the second device, although redundant to the uploaded version, may also appear to be a different file and erroneously marked for backup.

Aspects of the subject technology address the foregoing file duplication scenarios by providing systems and methods for identifying duplicates using a duplication reference list configured to validate multiple file signature types. In some aspects, a first signature type is determined for a file/content item by computing a hash on at least a portion of the file data; and a second signature type can be determined by identifying embedded file signature information, e.g., by identifying a platform specific identifier nested within the file data or, on some devices, by requesting the second signature type from the operating system. The platform specific identifier from which the second signature is derived can be created by an operating system or other process native to the device on which the content item is created. As discussed in further detail below, potential duplicates can be identified by comparing first signature and/or second signature information with the duplication reference list, which contains first type and/or second type signature information for all files previously received into cloud storage.

In some embodiments the disclosed technology is deployed in the context of a content management system having content item synchronization capabilities and collaboration features, among others. An example system configuration 100 is shown in FIG. 1, which depicts content management system 110 interacting with client devices 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, team, company, etc.) can create an account with content management system, and account details can be stored in account database 140. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

As discussed in further detail below, content management system 110 can also be configured to identify file duplicates either alone or in operative conjunction with client application 152, e.g., to avoid redundant file transfers to and/or from one or more client devices.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144.

Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content storage service 116, which includes software or other processor executable instructions for managing the storage of content items including, but not limited to, receiving content items for storage, preparing content items for storage, selecting a storage location for the content item, retrieving content items from storage, etc. In some embodiments, content storage service 116 can divide a content item into smaller chunks for storage at content storage 142. The location of each chunk making up a content item can be recorded in content directory 144.

In some aspects, content storage service 116 can be configured to perform transcoding operations, for example, to change a data format or file type of a content item that is received by a client device for storage in content storage 142. As discussed in further detail below, content storage service 116 may function, either alone, or in conjunction with one or more processes on a client device 150, to modify a content item format. By way of example, content storage service 116 may perform operations for transcoding an image file from a first format (e.g., a HEIF image format using a .heic extension), into a second file format (e.g., a JPEG format using a .jpeg or .jpg extension) before storage to content storage 142.

In some aspects, content directory 144 can include a duplication reference list that includes at least one entry for each content item stored in content storage 142. The duplication reference list can include one or more signatures associated with each stored content item, for example, that may be used to catalog those content items (files) already stored to content directory 144. In some embodiments, a first signature for a file may be calculated using a deterministic hash function, for example, that is computed using all, or a portion of, the file data. In another embodiment, a second signature for the file may be identified using a unique identifier (e.g., a platform specific identifier) or data tag that is included in the content item file data.

By referencing the signature information in the duplication reference list, content storage service 116 can avoid the duplicative storage of content items (files) received from client devices 150. Content storage service 116 can be used to output signatures (e.g., a first signature and/or a second signature) for each content item that is stored to content storage 142. Because each content item has a unique signature, content storage service 116 can determine content items on one or more of client devices 150 are cumulative to those already present in content storage 142, and avoid the file retrieval.

As discussed in further detail below, duplicates may be identified by content storage service 116 by calculating a first signature (data hash) and/or a second signature (platform specific ID) for each newly discovered content item on client devices 150. Comparison of the newly calculated signatures to the duplication reference list in content directory 144 can be used to identify file duplicates. For example, a duplicate content item may be identified if either one of the first signature or second signatures computed for the item matches an entry contained in the file duplication reference list of content directory 144. By avoiding the storage of duplicate files, or duplicate file blocks, content storage service 116 can decrease the amount of storage space required. Instead of storing multiple copies, content storage 142 can store a single copy of the content item or block of the content item and content directory 144 can include a pointer or other mechanism to link the duplicates to the single copy.

Content storage service 116 can also designate or record a content path for a content item in metadata database 146. The content path can include the name of the content item and/or folder hierarchy associated with the content item. For example, the content path can include a folder or path of folders in which the content item is stored in a local file system on a client device. While content items are stored in content storage 142 in blocks and may not be stored under a tree like directory structure, such directory structure is a comfortable navigation structure for users. Content storage service 116 can define or record a content path for a content item wherein the "root" node of a directory structure can be a namespace for each account. Within the namespace can be a directory structure defined by a user of an account and/or content storage service 116. Metadata database 146 can store the content path for each content item as part of a content entry.

In some embodiments the namespace can include additional namespaces nested in the directory structure as if they are stored within the root node. This can occur when an account has access to a shared collection. Shared collections can be assigned their own namespace within content management system 110. While some shared collections are actually a root node for the shared collection, they are located subordinate to the account namespace in the directory structure, and can appear as a folder within a folder for the account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150. As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item and/or a namespace to which the content entry belongs.

Content storage service 116 can also store metadata describing content items, content item types, folders, file path, and/or the relationship of content items to various accounts, collections, or groups in metadata database 146, in association with the signatures of the content item. Content storage service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content storage service can provide the ability to undo operations, by using a content item version control that tracks changes to content items, different versions of content items (including diverging version trees), and a change history that can be acquired from the server file journal 148.

Content Item Synchronization

Another feature of content management system 110 is synchronization of content items with at least one client device 150. Client device(s) can take different forms and have different capabilities. For example, client device $150_1$ is a computing device having a local file system accessible by multiple applications resident thereon. Client device $150_2$ is a computing device (e.g., a smart phone) wherein content items are only accessible to a specific application or by permission given by the specific application, and the content items are typically stored either in an application specific space or in the cloud. Client device $150_3$ is any client device accessing content management system 110 via a web browser and accessing content items via a web interface. While example client devices $150_1$, $150_2$, and $150_3$ are depicted in form factors such as a laptop, mobile device, or web browser, it should be understood that the descriptions thereof are not limited to devices of these example form factors. For example a mobile device such as client $150_2$ might have a local file system accessible by multiple applications resident thereon, or client $150_2$ might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices may be associated with an account of content management system 110, but in some embodiments client devices can access content using shared links and do not require an account. As noted above, some client devices can access content management system 110 using a web browser. However, client devices can also access content management system 110 using client application 152 stored and running on client device 150. Client application 152 can include a client synchronization service 156.

Client synchronization service 156 can be in communication with server synchronization service 112 to synchronize changes to content items between client device 150 and content management system 110. Client device 150 can synchronize content with content management system 110 via client synchronization service 156. The synchronization can be platform agnostic. That is, content can be synchronized across multiple client devices of varying type, capabilities, operating systems, etc. Client synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while client synchronization service 156 can monitor directory on client device 150 for changes to files within the monitored folders.

When client synchronization service 156 detects a write, move, copy, or delete of content in a directory that it monitors, client synchronization service 156 can synchronize the changes to content storage service 116. In some embodiments, client synchronization service 156 can perform some functions of content storage service 116 including functions addressed above such as dividing the content item into blocks, hashing the content item to generate a unique identifier, etc. Client synchronization service 156 can index content within client storage index 164 and save the result in storage index 164. Indexing can include storing paths plus a unique server identifier, and a unique client identifier for each content item. In some embodiments, client synchronization service 156 learns the unique server identifier from server synchronization service 112, and learns the unique client identifier from the operating system of client device 150.

Client synchronization service 156 can use storage index 164 to facilitate the synchronization of at least a portion of the content within client storage with content associated with a user account on content management system 110. For example, client synchronization service 156 can compare storage index 164 with content management system 110 and detect differences between content on client storage and content associated with a user account on content management system 110. Client synchronization service 156 can then attempt to reconcile differences by uploading, downloading, modifying, and deleting content on client storage as appropriate. Content storage service 116 can store the changed or new block for the content item and update server file journal 148, metadata database 146, content directory 144, content storage 142, account database 140, etc. as appropriate.

In some aspects, client synchronization service 156 may be configured to identify or compute one or more file signatures that can be used to avoid the transfer of duplicate files to the content management system 110. By way of example, client synchronization service 156 may identify a first signature and a second signature for each file (content item) on client device 150. One or both signatures can then be sent to content storage service 116 for comparison with the duplication reference list in content directory 144, as discussed above. If one or more of the signatures provided by client synchronization service 156 is determined to match with the duplication reference list, data transfer of the corresponding content item may be avoided. Alternatively, if no signature match is identified with the duplication reference list, the content item may be flagged for upload by client synchronization service 156.

When synchronizing from content management system 110 to client device 150, any one of a: modification, addition, deletion, or move of a content item recorded in server file journal 148 can trigger a notification to be sent to client device 150 using notification service 117. When client device 150 is informed of the change, a request changes listed in server file journal 148 since the last synchronization point known to the client device is sent. When client device 150 determines that it is out of synchronization with content management system 110, client synchronization service 156 requests content item blocks including the changes, and updates its local copy of the changed content items.

In some embodiments, storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for content item changes and queue those changes for later synchronization to content management system 110 when a network connection is available. Similarly, a user can manually start, stop, pause, or resume synchronization with content management system 110.

Client synchronization service 156 can synchronize all content associated with a particular user account on content management system 110. Alternatively, client synchronization service 156 can selectively synchronize a portion of the content of the total content associated with the particular user account on content management system 110. Selectively synchronizing only a portion of the content can preserve space on client device 150 and save bandwidth.

In some embodiments, client synchronization service 156 selectively stores a portion of the content associated with the particular user account and stores placeholder content items in client storage for the remainder portion of the content. For example, client synchronization service 156 can store a placeholder content item that has the same filename, path, extension, metadata, of its respective complete content item on content management system 110, but lacking the data of the complete content item. The placeholder content item can be a few bytes or less in size while the respective complete content item might be significantly larger. After client device 150 attempts to access the content item, client synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments a link can be associated with access restrictions enforced by content management system 110 and access control list 145. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier or multiple user account identifiers to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145. For example, in some embodiments, user account identifiers associated with a single content entry can specify different permissions for respective user account identifiers with respect to the associated content item.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Team Service

In some embodiments content management system 110 includes team service 130. Team service 130 can provide functionality for creating and managing defined teams of user accounts. Teams can be created for a company, with sub-teams (e.g., business units, or project teams, etc.), and user accounts assigned to teams and sub-teams, or teams can be created for any defined group of user accounts. Teams service 130 can provide a common shared space for the team, private user account folders, and access limited shared folders. Teams service can also provide a management interface for an administrator to manage collections and content items within team, and can manage user accounts that are associated with the team.

Authorization Service

In some embodiments, content management system 110 includes authorization service 132. Authorization service 132 ensures that a user account attempting to access a namespace has appropriate rights to access the namespace. Authorization service 132 can receive a token from client application 152 that follows a request to access a namespace and can return the capabilities permitted to the user account. For user accounts with multiple levels of access (e.g. a user account with user rights and administrator rights) authorization service 132 can also require explicit privilege escalation to avoid unintentional actions by administrators.

Presence and Seen State

In some embodiments, content management system can provide information about how users with which a content item is shared are interacting or have interacted with the content item. In some embodiments, content management system 110 can report that a user with which a content item is shared is currently viewing the content item. For example, client collaboration service 160 can notify notifications service 117 when client device 150 is accessing the content item. Notifications service 117 can then notify all client devices of other users having access to the same content item of the presence of the user of client device 150 with respect to the content item.

In some embodiments, content management system 110 can report a history of user interaction with a shared content item. Collaboration service 126 can query data sources such as metadata database 146 and server file journal 148 to determine that a user has saved the content item, that a user has yet to view the content item, etc., and disseminate this status information using notification service 117 to other users so that they can know who currently is or has viewed or modified the content item.

Collaboration service 126 can facilitate comments associated with content, even if a content item does not natively support commenting functionality. Such comments can be stored in metadata database 146. In some aspects, collaboration service 126 can originate and transmit notifications for users. For example, a user can mention another user in a comment and collaboration service 126 can send a notification to that user that he has been mentioned in the comment. Various other content item events can trigger notifications, including deleting a content item, sharing a content item, etc. Collaboration service 126 can also provide a messaging platform whereby users can send and receive instant messages, voice calls, emails, etc.

Collaboration Content Items

In some embodiments content management service can also include Collaborative document service 134 which can provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments this can be managed by requiring two users access a content item through a web interface and there they can work on the same copy of the content item at the same time.

Collaboration Companion Interface

In some embodiments client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an Application Programming Interface (API) on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 142 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, that resides on client device 150 and is configured to communicate with content management system 110. In various implementations, the client-side application 152 can present a user interface (UI) for a user to interact with content management system 110. For example, the user can interact with the content management system 110 via a file system explorer integrated with the file system or via a webpage displayed using a web browser application.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. More-over, features described herein with respect to an embodiment can be combined with features described with respect to another embodiment.

Figure 2:
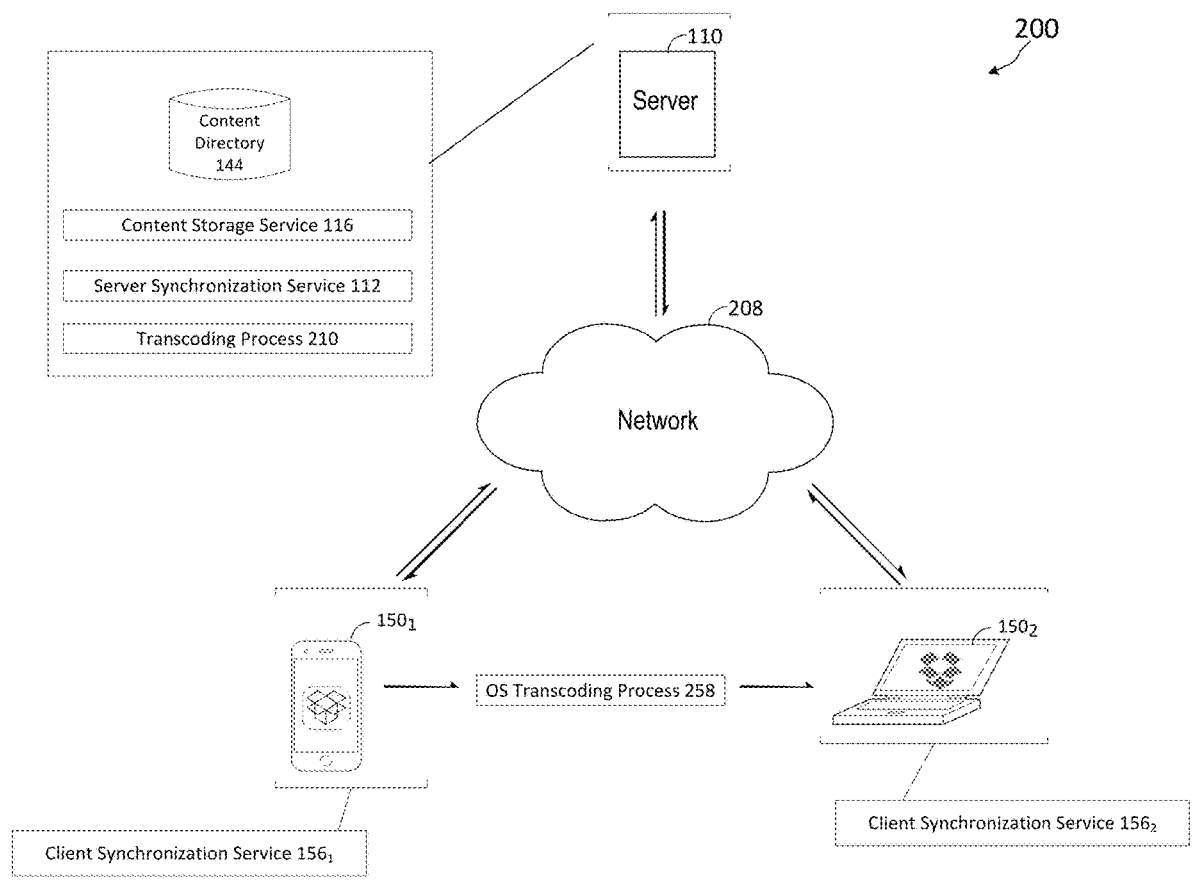
FIG. 2 illustrates an example of devices used in an environment in which aspects of the technology may be implemented.

FIG. 2 illustrates an example of devices used in an environment 200 in which some aspects of the technology can be implemented. Environment 200 includes client devices 150, including first device $150_1$ (e.g., a smartphone) and second device $150_2$ (e.g., a laptop computer). In the illustrated topology, client devices 150 are communicatively coupled to each other, as well as to content management system 110, e.g., via network 208. It is understood that connections between client devices 150 and/or content management system 110 can be accomplished using wired or wireless means. For example, first device $150_1$ may be coupled to second device $150_2$ using a physical bus, such as a Universal Serial Bus (USB), or the like. Similarly, client devices 150 can be coupled to network 208 using a wired or a wireless network interface card (NIC), or the like.

It is understood that environment 200 may include a number of other processor-based devices, such as tablet computers, console gaming systems, desktop computers, etc., without departing from the scope of the technology. Additionally, network 208 can represent two or more interconnected private and/or public networks, such as local area networks (LANs), wide area networks (WANs), or a network of networks, such as the Internet.

Content management system 110 can represent one or more computers configured to provide services to user devices connected to network 208. Content management system 110 can represent a distributed array of computers, for example, forming a computing cluster. In some implementations, content management system 110 can be configured to support a cloud storage platform, whether as a synchronized service as discussed above, or merely as a data backup service.

Client devices 150 can execute software configured to interface with a content management system 110, for example, that is hosted by one or more servers. Client devices 150 can belong to a single user and execute software, such as a client application 152 (discussed above) that includes a client synchronization service 156, and that is configured to facilitate backup and synchronization of data from client devices 150 into the cloud. Management operations required to sync and/or backup content items (files) from client devices 150 can be shared between processes running on client devices 150 and/or content management system 110. By way of example, the backup of new files or content items created on first device $150_1$ can be facilitated by client synchronization service $156_1$ and content storage service 116. The synchronization of files between first device $150_1$ and second device $150_2$, e.g., via content management system 110, can also be facilitated by client synchronization service $156_2$.

File de-duplication is facilitated by software or routines executed on content management system 110 and/or client devices 150. For example, content storage service 116 and/or server synchronization service 112 on content management system 110 can identify a first signature type and/or a second signature type for each content item to be received from a client device, and to reference the signature against a duplication reference list stored in content directory 144.

In some aspects, content storage service 116 can determine the first and second signatures for a file that is indicated for upload e.g., by a client synchronization service 156. In other aspects, first and second signatures for a file may be determined by software or routines executed locally on the client device. For example, first and second signatures may be computed by a client synchronization service 156 on the client devices 150, and provided to the content storage service 116 for duplication checking.

Depending on implementation, the first signature may be determined by computing a deterministic hash based on at least a portion of the content item data, whereas the second signature may be determined by identifying a platform specific identifier either embedded in the content item data or accessed from the operating system through an API (or other process) on client devices $150_1$. As discussed above, the platform specific identifier can include a tag or unique signature that is embedded by a native OS or process during the content creation process, such as during the image capture performed by a client device (e.g., a smart phone). One or both signatures can be compared to the duplication reference list to determine if the file is duplicative of information already stored to the cloud service. Duplicate files may be identified as those having one or more signatures matching a signature occurring in the duplication reference list.

In some aspects, duplicate files are automatically ignored, i.e., not uploaded from client devices 150 to content management system 110. However, in some aspects, identification of a duplicate file based on first or second signature information can trigger a notification to the user, for example, to provide an option as to whether the content item should be backed up.

Figure 3A:
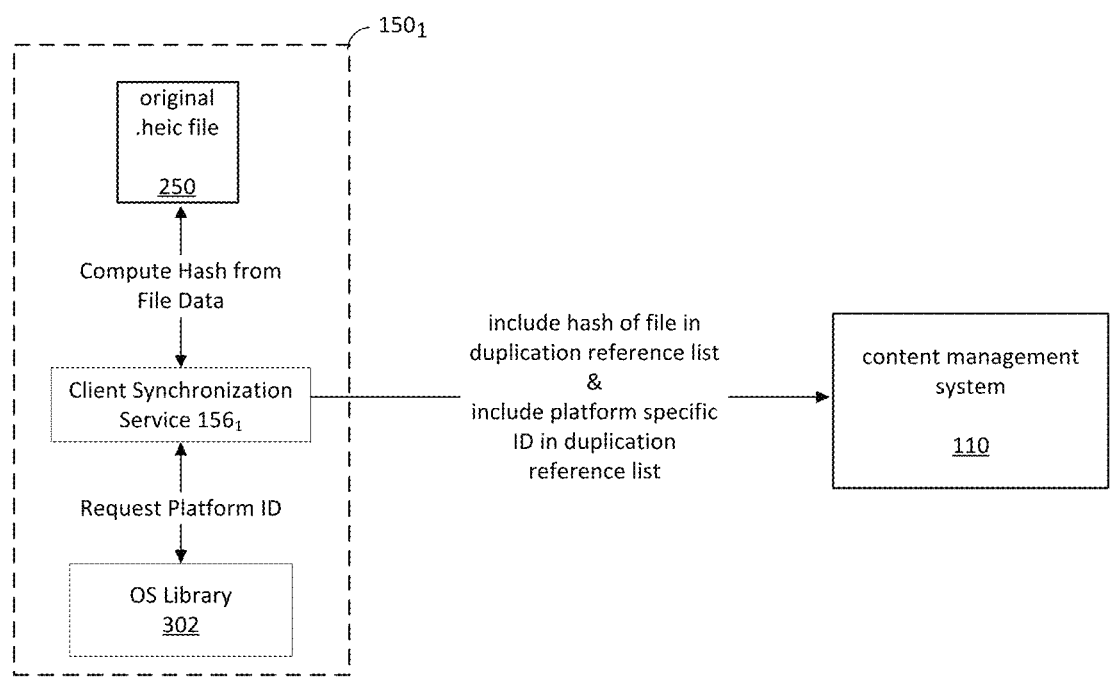
FIGS. 3A-3D illustrate an example process that can be used to identify duplicate files, according to some aspects of the technology.

In practice, and as illustrated in FIG. 3A, a new content item 250, such as an image (.heic) file, can be generated on first device $150_1$ using a first file format (e.g., a HEIF format) native to an operating system of first device $150_1$ (e.g., iOS 11). For some operating systems, such as iOS 11, a platform specific identifier unique to the content item may be accessed via an API (or other process), from the operating system, e.g. using an OS library 302. A hash of the content item 250 can also be computed, for example, by client synchronization service $156_1$, running on first device $150_1$. Content item 250 can then be backed up from a first memory location on first device $150_1$ to content management system 110, in its original format (e.g., a .heic file). During backup of content item 250, first and second signatures can be provided to a duplication reference list on content management system 110. That is, a first signature based on a hash of content item 250, and a second signature, based on the platform specific identifier of the original file can both be provided to content management system by synchronization service $156_1$.

Figure 3B:
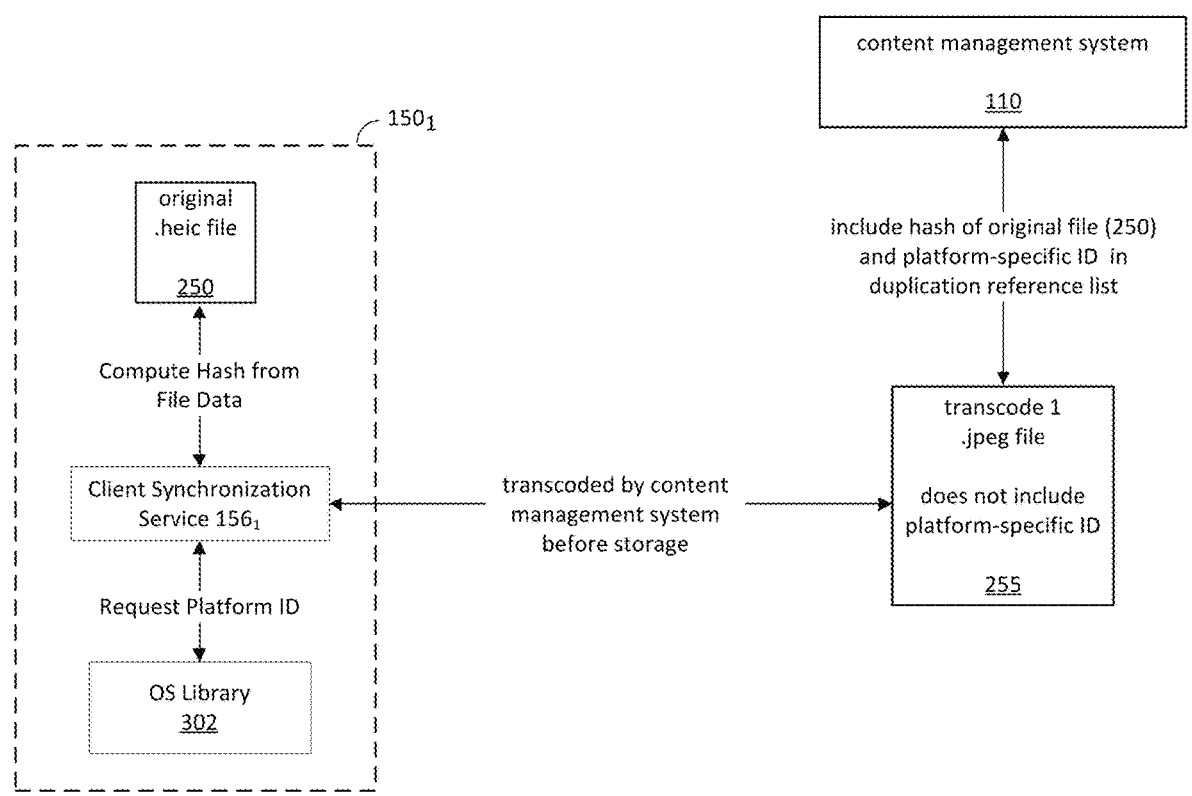

As illustrated in FIG. 3B, it is also possible that content item 250 is transcoded into another file format by transcoding process 210 for compatibility with other devices before the file is moved into cloud storage. Since transcoding happens on device $150_1$, client synchronization service $156_1$ (i.e., the mobile client application) can request the platform specific identifier from the operating system. Resulting content item 255 can be stored in content management system 110 and a hash of the original content item 250 and the platform specific identifier can be stored in the duplication reference list of content management system 110. In some implementations, resulting content item 255 can also be transferred to second device $150_2$, where it is stored in a second memory location, for example, that is local to the hardware of second device $150_2$. While in the embodiment illustrated in FIG. 3B, content item 250 is not stored at content management system, as discussed below, it can be useful to store a hash signature for content item 250 in duplication reference list to prevent content item 250 from itself being uploaded later.

Figure 3C:
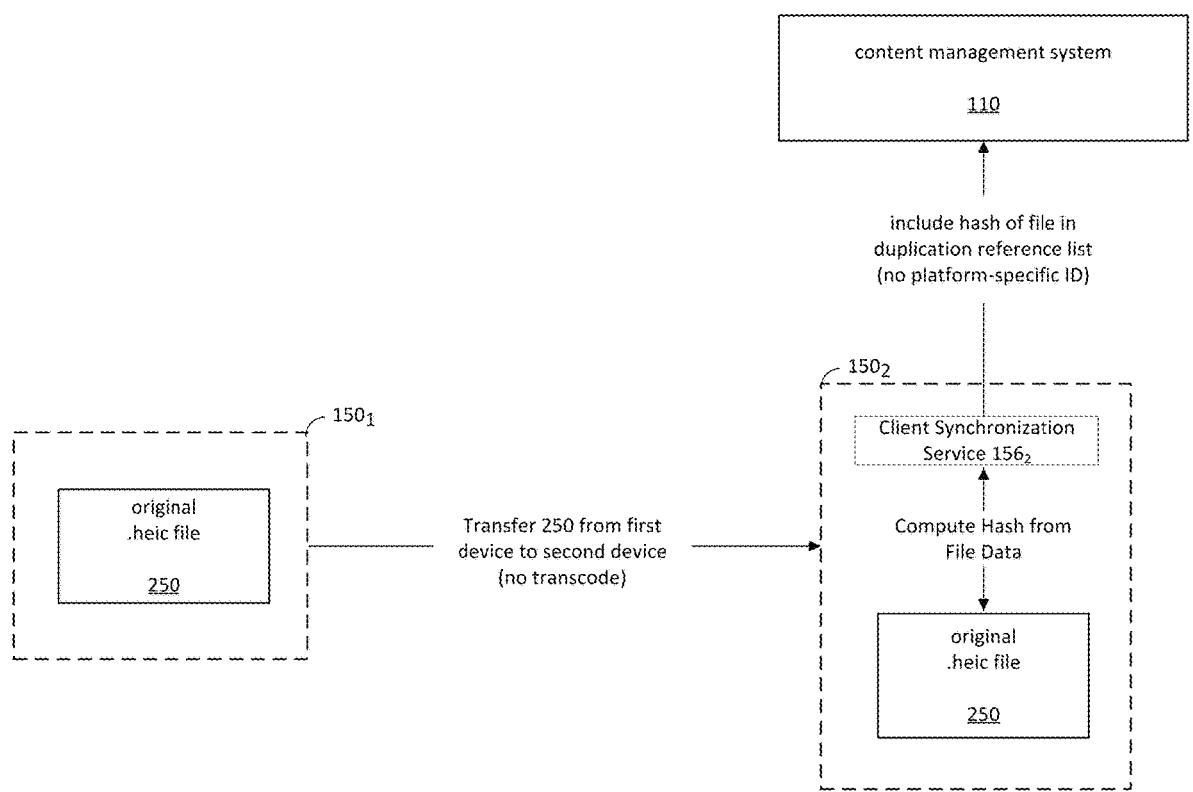

FIG. 3C conceptually illustrates an example in which only first signature information is provided to content management system 110. In this example, an original content item 250 (.heic file) created on first device $150_1$ is transferred to second device $150_2$, e.g., via a USB cable or other means, without transcoding. Subsequently, a backup of original content item 250 is provided to content management system 110 by client synchronization service $156_2$ running on second device $150_2$. A first signature is computed by client synchronization service 156 and provided to content management system 110 with the file backup. However, no second signature (platform-specific ID) information is provided. In such scenarios, the first signature information, added to the duplication reference list, can be used to prevent subsequent redundant backups.

Figure 3D:
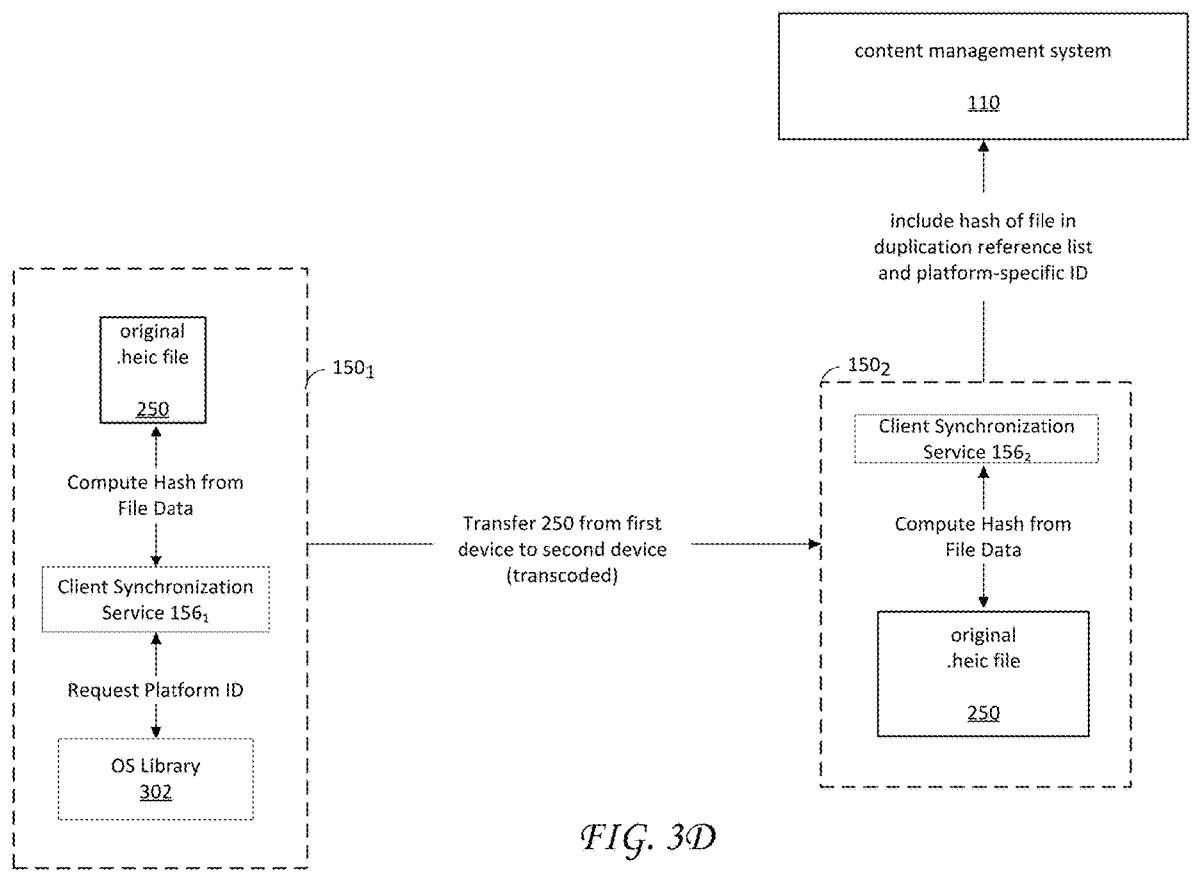

As illustrated in FIG. 3D, in instances where the native OS of second device $150_2$ is different from the OS of first device $150_1$, such as a different OS type or a different version of the same OS, transfer of content item 250 can involve transcoding, for example, that is performed by OS transcoding process 258. OS transcoding process 258 can be implemented by an OS of first device $150_1$ (i.e., iOS), and may be different from the transcoding performed by transcoding process 210 when providing file uploads to content management system 110. That is, OS transcoding process 258 may utilize different algorithms and/or codecs than transcoding process 210. Content item 260 resulting from transcoding 258, may have a similar (or different) file extension as content item 255, but different byte-wise data due to the differences between transcoding process 210, and transcoding process 258. The transcoding performed using process 258, embeds the platform specific identifier in the file data that the client synchronization service $156_1$ running on client device $150_1$ is able to access through operating system APIs. Note that in the embodiment illustrated in FIG. 3D, content management system 110 is interacting with client device $150_2$ and therefore cannot take a hash signature of content item 250 since it does not have access to client device $150_1$.

Duplicate file backups can be avoided by comparing signatures for a content item with a duplication reference list. Further to the above example, the client synchronization service $156_1$ on client device $150_1$ determines the signatures and sends them to the content management system 110 with the new content item. Once received, the content management system 110 may review the first and second signatures of the original (non-transcoded) version, which are stored to a duplication reference list, for example, in content directory 144, as discussed above. In some implementations, a first signature can be based on a deterministic hash computed with respect to all (or a portion) of the data for the new content item. The second signature can be determined by identifying a unique platform specific identifier embedded in the new content item data or from the client synchronization service $156_1$ querying the operating system of first device $150_1$ (e.g., iOS 11) for the platform specific identifier.

Potential file duplicates are identified by computing signature information for the new content item (file), and comparing the signatures to entries in the duplication reference list. In the described scenario, the transcoded version of the new content item that is received by second device $150_2$ may be marked for upload/backup, i.e., by client synchronization service $156_2$. To determine if the new content item in the second memory location is duplicative of the backup on content management system 110, the client synchronization service $156_1$ can determine first and second signatures for the new content item, and compare them to the signatures in the duplication reference list.

In one aspect, where the backed up copy on content management system 110 is an original (non-transcoded .heic file), the first signatures can be different, since a deterministic hash function computed on different data (e.g., .heic vs. .jpeg) produces a different output. However, second signature information, which is determined based on an embedded platform specific identifier that is maintained through transcoding, can be the same. Based on similarities between the second signature determined for the new content item on second device $150_2$, and entries of the duplication reference list, the new content item residing in the second storage location can be identified as a duplicate. Similarly, if a transcoded copy of the content item is backed up to content management system 110 (e.g., from second device $150_2$), then a later upload of the original .heic file attempted from first device $150_1$ may be detected as a duplicate on account of the platform specific ID (second signature). In either scenario, the duplicated content item may be marked as a "duplicate," e.g., by client synchronization service $156_2$, so that later attempts to upload the duplicate are avoided.

In another aspect, where the backed up copy on content management system 110 is a transcoded version (i.e., stored as a .jpeg file using transcoding process 210), the data of the .jpeg stored to the cloud service, and that of the version stored to the second memory location on second device $150_2$ (transcoded using OS transcoding process 258) may be different, i.e., due to differences between transcoding implemented by transcoding process 210, and OS transcoding process 258 (e.g., different in that they may use different codecs).

Although the server version and the client device version may share a common file format (e.g., .jpeg), byte-wise data differences result in different hash computations, and therefore result in differences in the first signature computed for each version. However, the second signature determined for each version can be the same. That is, the second signature, identified by content storage service 116 (based on a platform specific identifier in the file data), is the same as the second signature computed for the transcoded version of the content item stored on second device $150_2$. In such implementations, when the second signature (for the transcoded version of the content item stored on second device $150_2$), is compared to the duplication reference list, the content item duplication can be identified. Similarly, the second signature may be used to identify file duplicates in the foregoing example if the upload order were to be reversed. That is, if the transcoded content item on second device $150_2$ was first provided to content storage service 116, then a later transcoded upload of the item from first device $150_1$ could be identified based on the platform specific ID information (second signature). Similar to the above example, the new content item may be marked as a duplicate, e.g., by client synchronization service $156_2$, so that the version stored at the second memory location on second device $150_2$ is not re-uploaded.

Where transcoding is performed using a similar process (e.g., similar codecs) resulting in identical file outputs or where original copies of the new content item are transferred to second device $150_2$, then hash computations can produce similar first signatures. In such instances, file duplication can be determined based on matches between the first signature for the new content item, and the duplication reference list. In some embodiments, where first and second signature information of a new content item cannot be matched with any entry in the duplication reference list, the file/item can be marked for upload, and the duplication reference list can be updated to include the new signature information.

In some embodiments, the first signature must be relied upon to identify file duplicates. For example, suppose a content item is uploaded from first device $150_1$, with transcoding performed by transcoding process 210. The first signature of the content item can be calculated before transcoding performed by process 210 and uploaded to Content Management System 110 along with the content item. If the same content item is later transferred (without transcoding) in original form (.heic) to second device $150_2$ from first device $150_1$, the second signature (i.e., platform specific ID) would not be available for the version transferred to second device $150_2$. However, the first signature (based on file hashing) could be used to identify the file duplication. Similarly, if in the foregoing example, the content item were to be first uploaded from second device $150_2$, with a later upload occurring from first device $150_1$ (with transcoding provided by process 210), then first signature information could be used to identify the duplication.

In some embodiments, first and/or second signatures may be used to detect file duplication. By way of example, if an original content item (e.g., in .heic format) is backed up from a first device $150_1$ without transcoding, and then the file is later retrieved (e.g., either from first device $150_1$ or second device $150_2$) and transcoded (e.g., using transcoding process 210), then both signature types could potentially be used to identify the duplication. That is, a hash of the content item (first signature) could be identified prior to transcoding, and used to prevent duplication. Additionally, the platform specific ID could identify both files, and also used to prevent duplication. Similarly, both signatures can be used if the foregoing upload order is reversed. That is, if a content item (.heic) is transcoded during upload to content storage service 116, and then later uploaded in its original file format, either the first signature (hash) or second signature (platform specific ID) could be used to identify the duplication.

It is important that content items that are uploaded to content management system 110 have both the deterministic hash signature and the platform specific identifier because the version of the content item stored to content management system can become separated from the platform specific identifier. For example, and with reference to FIG. 3B, content storage service 116 can identify content item 250 on client device $150_1$ as a unique content item to be uploaded. For compatibility reasons, content management system 110 can use transcoding process 210 to transcode content item 250 into resulting content item 255. Since the resulting content item does not include a platform specific identifier within the file (or even if it did store it in metadata, the metadata can be lost), it is important that content management system 110 store a hash signature for the file as well as the platform specific identifier.

Later, when determining files for upload, content management system 110 can recognize content item 250 by its platform specific identifier (and in some embodiments, also its hash signature). The client synchronization service $156_1$ should not see resulting content item 255 since it was transcoded only for purposes of storage at content management system 110 and was not stored on client device $150_1$.

However, in some instances resulting content item 255 can become stored at client device 150, presumably after a user downloads content item 255 from content management system 110. In such instances, content item 255 may appear to be a candidate for upload from device 150. Since content item 255 does include a platform specific identifier, but may have been changed when saved back to device 150, the only way to determine that this content item is a duplicate is by using its hash signature. Accordingly, both signatures—the hash signature, and the platform specific identifier—need to be stored to prevent duplicate uploads.

Figure 4:
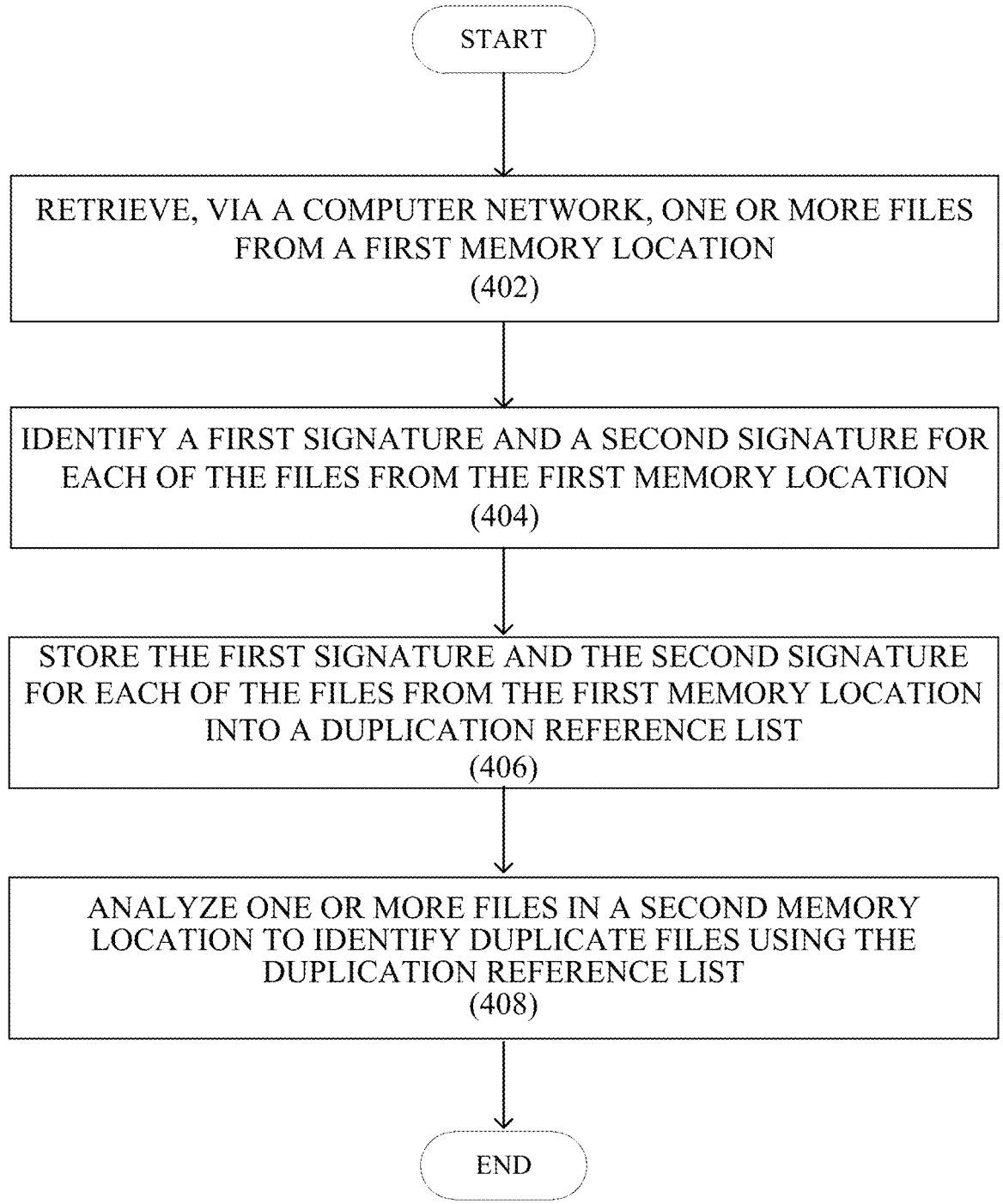
FIG. 4 illustrates example steps for implementing a file deduplication process, according to some aspects of the subject technology.

FIG. 4 illustrates an example process 400 that can be used to identify duplicate content items, according to some aspects of the technology. Process 400 begins with step 402 in which one or more content items are retrieved from a first memory location, for example, resident on a client device, such as first device $150_1$, described above. Retrieval of the content items can be facilitated by a content management system, such as content management system 110, described above.

In one aspect, content item retrieval 402 includes the transfer and storage of an image file, for example, that was created by the first network device (e.g., an image capture device), and stored in the first memory location of the first network device using a first image format. By way of example, the file may be a HEIF image that is stored using a .heic file extension, and which has a platform specific ID assigned by the operating system.

In another aspect, the image file may have originated at a device different from the first network device associated with the first memory location, but may still include a platform specific ID. For example, the image file may be the result of a transcoding process that preserved the original platform specific ID information.

Subsequently a first signature and a second signature for each of the content items retrieved from the first memory location are identified 404. As discussed above, the first signature determined for each of the files can be computed using a deterministic hash function. That is, the first signature for each of the files can be based on a hash computation for the data of the corresponding content item.

Where global ID information has been left intact, the second signature determined for each of the files can be based on the corresponding platform specific identifier embedded in the file data. In reference to the foregoing example, first and second signatures can be identified for the image file.

Next, the first signature and/or the second signature for each of the files from the first memory location are stored 406 into a duplication reference list. Entries in the duplication reference list can correspond to file signatures for content items that have been previously uploaded and stored into a cloud storage service. The duplication reference list may store both first and second signature information; however, other aspects are contemplated. As discussed above, for some files, only first signature information (e.g., hash signatures) may be stored into the duplication reference list. Alternatively, for some files, a second signature will be stored, allowing for de-duplication detection in the case where the first signatures for transcodes of the same content item differs (i.e. because the underlying bytes are different).

Finally, one or more files in a second memory location are analyzed 408 to identify duplicate files using the duplication reference list Similar to the above examples, the second memory location can correspond with a local memory of a client device, such as second device $150_2$ connected to a content management system. As a note, the second memory location can be of the same type as the first memory location. The second memory location can therefore correspond with files stored with a separate and distinct device from that of a first device associated with the first memory location. The first device and second device, as described above, may have different operating systems, and therefore may use different file systems and support different file extensions.

First and second signatures can be determined for each of the files in the second memory location, and compared to the duplication reference list to identify file duplicates. For example, duplicates may be identified when at least one of the first signature or the second signature for a given file matches an entry in the duplication list. Further to the foregoing example, an identical (.heic) file in the second memory location may provide matches for both first and second signatures, as the computed hash would be identical (based on identical file data), and the platform specific identifiers (identified within file data) would also match.

In other instances, file transcoding, for example, performed by the cloud storage service and/or by an operating system of the first device, may result in redundant files (e.g., image files) at the first and second memory locations, but have different byte-wise data. Where files are duplicative but represented by different data, the second signature may be used to identify file duplicates in instances where the platform specific identifier was preserved. If for any reason, wherein platform specific identifier information is not maintained during transcoding, file redundancies may be identified based on hash based signatures (e.g., a first signature calculated for each respective file).

It is understood that signature determinations for various files/content items can be performed by different processes, for example, running at different locations. That is, first signature and second signature information for a given file may be resolved by a local process running on a client device, such as by a client application 152 discussed above. In such implementations, the signature information for a local file may be transmitted to the content management system before file uploading is allowed to proceed. In other implementations, first signature information and second signature information may be determined by a process running on the cloud management service, such as using content management system 110, discussed above. In yet another aspect, signature determinations may be based on distributed processes, for example, executed on any number of client devices, and/or cloud service provider hardware, associated with a particular user or cloud management account.

Figure 5:
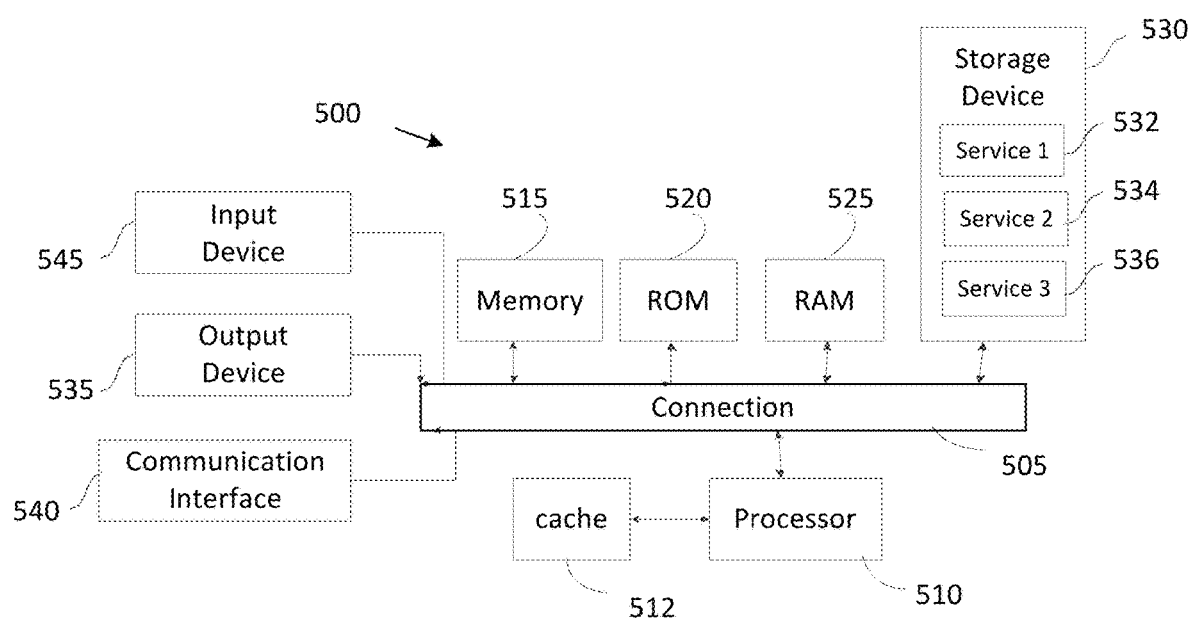
FIG. 5 shows an example of a system for implementing certain aspects of the present technology.

FIG. 5 shows an example of computing system 500, which can be for example any computing device making up client devices 150, content management system 110 or any component thereof in which the components of the system are in communication with each other using connection 505. Connection 505 can be a physical connection via a bus, or a direct connection into processor 510, such as in chipset architecture. Connection 505 can also be a virtual connection, networked connection, or logical connection.

Computing system 500 can be a distributed system in which the described functions can be distributed within a datacenter, multiple datacenters, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method for preventing file duplication, the method comprising:
   identifying a first signature and a second signature for one or more files from a first memory location, wherein the second signature is a platform specific identifier embedded in the one or more files from the first memory location;
   storing the first signature and the second signature for the one or more files from the first memory location into a duplication reference list;
   detecting one or more files in a second memory location for upload to the first memory location;
   identifying a first signature and a second signature for the one or more files in the second memory location;
   comparing the first signature and the second signature of the one or more files in the second memory location with the first signature and second signature of the one or more files in the first memory location that are in the duplication reference list to identify duplicate files using the duplication reference list;
   determining that the first signature of the one or more files in the second memory location is not found in the duplication reference list, and determining that the second signature of the one or more files in the second memory location is found in the duplication reference list;
   when the second signature is found in the duplication reference list, determining that one of the one or more files in the second memory location is a duplicate file of one of the one or more files in the first memory location; and
   determining to not upload the one of the one or more files in the second memory location to the first memory location when the one of the one or more files in the second memory location is a duplicate file of one of the one or more files in the first memory location.

2. The computer-implemented method of claim 1, wherein comparing the first signature and the second signature of the one or more files in the second memory location with the first signature and second signature of the one or more files in the first memory location that are in the duplication reference list to identify duplicate files using the duplication reference list further comprises:
   receiving, from a second client device, the first signature and the second signature for each of the one or more files in the second memory location, wherein the second memory location corresponds with a local memory of the second client device.

3. The computer-implemented method of claim 1, wherein the first memory location is associated with a first client device and the second memory location is associated with a second client device.

4. The computer-implemented method of claim 1, wherein the first signature is based on a hash of at least a portion of file data for the one or more files from the first memory location.

5. The computer-implemented method of claim 1, wherein a format of the one or more files from the first memory location is a HEIF format or a JPEG format transcoded by a first codec from the HEIF format.

6. The computer-implemented method of claim 5, wherein a format of the one or more files in the second memory location comprises the JPEG format transcoded by the first codec from the HEIF format and the JPEG format transcoded by a second codec from the HEIF format, the first codec embeds the platform specific identifier in the JPEG format, and the second codec does not embed the platform specific identifier in the JPEG format.

7. The computer-implemented method of claim 1, wherein the second signature indicates that the one of the one or more files in the second memory location is a transcoded version of the one of the one or more files in the first memory location.

8. The computer-implemented method of claim 1, wherein, when the second signature of the one or more files in the second memory location is found in the duplication reference list, the one of the one or more files in the second memory has a different size than the one or more files in the first memory location.

9. A non-transitory computer readable medium comprising instructions, the instructions, when executed by a computing system, cause the computing system to:
   identify a first signature and a second signature for one or more files retrieved from a first memory location, wherein a format of the one or more files from the first memory location is a HEIF format or a JPEG format transcoded by a first codec from the HEIF format, the first signature is based on a hash for at least a portion of file data for the one or more files from the first memory location, and the second signature is a platform specific identifier embedded in the one or more files from the first memory location, the platform specific identifier is embedded during a content creation process of the HEIF format of the one or more files from the first memory location;

store the first signature and the second signature for the one or more files from the first memory location into a duplication reference list;

detect one or more files in a second memory location for upload to the first memory location, wherein a format of the one or more files in the second memory location comprises the JPEG format transcoded by the first codec from the HEIF format and the JPEG format transcoded by a second codec from the HEIF format;

identify a first signature and a second signature for the one or more files in the second memory location;

compare the first signature and the second signature of the one or more files in the second memory location with the first signature and the second signature of the one or more files in the first memory location that are in the duplication reference list to identify duplicate files using the duplication reference list;

when the first signature of the one or more files in the second memory location is not found in the duplication reference list, determine whether the second signature of the one or more files in the second memory location is found in the duplication reference list;

when the second signature is found in the duplication reference list, determine that one of the one or more files in the second memory location is a duplicate file of one of the one or more files in the first memory location; and cancel upload of the one of the one or more files in the second memory location to the first memory location when the one of the one or more files in the second memory location is a duplicate file of one of the one or more files in the first memory location.

10. The non-transitory computer readable medium of claim 9, wherein the instructions to compare the first signature and the second signature of the one or more files in the second memory location with the first signature and the second signature of the one or more files in the first memory location that are in the duplication reference list to identify duplicate files using the duplication reference list further comprises instructions to:

receive, from a second client device, the first signature and the second signature for the one or more files in the second memory location, wherein the second memory location corresponds with a local memory of the second client device.

11. The non-transitory computer readable medium of claim 9, wherein the first codec embeds the platform specific identifier in the JPEG format, and the second codec does not embed the platform specific identifier in the JPEG format.

12. A system comprising:
one or more processors;
a network interface coupled to the one or more processors; and
a computer-readable medium coupled to the one or more processors, wherein the computer-readable medium stores instructions configured to cause the one or more processors to:

identify a first signature and a second signature for one or more files from a first memory location, wherein the first signature is based on a hash of at least a portion of file data for the one or more files from the first memory location, and the second signature is a platform specific identifier embedded in the one or more files from the first memory location;

store the first signature and the second signature for the one or more files from the first memory location into a duplication reference list;

detect one or more files in a second memory location for upload to the first memory location;

identify a first signature and a second signature for the one or more files in the second memory location;

compare the first signature and the second signature of the one or more files in the second memory location with the first signature and second signature of the one or more files in the first memory location that are in the duplication reference list to identify duplicate files using the duplication reference list;

when the first signature of the one or more files in the second memory location is not found in the duplication reference list, determining whether the second signature of the one or more files in the second memory location is found in the duplication reference list when the second signature is found in the duplication reference list, determine that one of the one or more files in the second memory location is a duplicate file of one of the one or more files in the first memory location; and determine to not upload the one of the one or more files in the second memory location to the first memory location when the one of the one or more files in the second memory location is a duplicate file of one of the one or more files in the first memory location.

13. The system of claim 12, wherein the instructions to compare the first signature and the second signature of the one or more files in the second memory location with the first signature and second signature of the one or more files in the first memory location that are in the duplication reference list to identify duplicate files using the duplication reference list further comprises instructions to:

receive, from a second client device, a first signature and a second signature for each of the one or more files in the second memory location, wherein the second memory location corresponds with a local memory of the second client device.

14. The system of claim 12, wherein the first memory location is associated with a first processor-based device and the second memory location is associated with a second processor-based device.

* * * * *